United States Patent [19]

Stehle et al.

[11] Patent Number: 4,905,530
[45] Date of Patent: Mar. 6, 1990

[54] SHIFTING ARRANGEMENT FOR AN AUTOMATIC TRANSMISSDION OF A MOTOR VEHICLE

[75] Inventors: Heinz Stehle, Weissach; Robert Mueller, Mönsheim; Norbert Stelter, Weissach, all of Fed. Rep. of Germany

[73] Assignee: Dr. Ing. h.c.F. Porsche AG, Stuttgart, Fed. Rep. of Germany

[21] Appl. No.: 298,057

[22] Filed: Jan. 18, 1989

[30] Foreign Application Priority Data

Sep. 29, 1988 [DE] Fed. Rep. of Germany ....... 3832969

[51] Int. Cl.⁴ ................... B60K 20/10; B60K 41/18
[52] U.S. Cl. ......................................... 74/335; 74/850
[58] Field of Search ............................ 74/335, 850

[56] References Cited

U.S. PATENT DOCUMENTS

| | | | |
|---|---|---|---|
| 4,513,276 | 4/1985 | Kubota et al. | 74/850 X |
| 4,570,502 | 2/1986 | Klatt | 74/335 |
| 4,610,179 | 9/1986 | Parker | 74/335 |
| 4,621,328 | 11/1986 | Ardi et al. | 74/335 X |
| 4,821,590 | 4/1989 | Tury et al. | 74/335 |

OTHER PUBLICATIONS

DK 629113.5 Elektronische 7/1983 Getriebestriuring (Germany).

*Primary Examiner*—Dirk Wright
*Attorney, Agent, or Firm*—Barnes & Thornburg

[57] ABSTRACT

A shifting arrangement for an automatic transmission of a motor vehicle controlled by an electronic control apparatus includes a selector lever to be operated manually. By displacement of the selector lever in a first shifting lane, the different transmission speeds can be selected. After shifting the shifting lever by way of a transverse lane into a second shifting lane, the desired forward speed can be manually engaged by means of the same. The shifting operation is picked up by means of a sensor which influences a shifting unit. The shifting unit effects the maintenance of an actually engaged transmission speed during a change of the shifting lane.

10 Claims, 4 Drawing Sheets

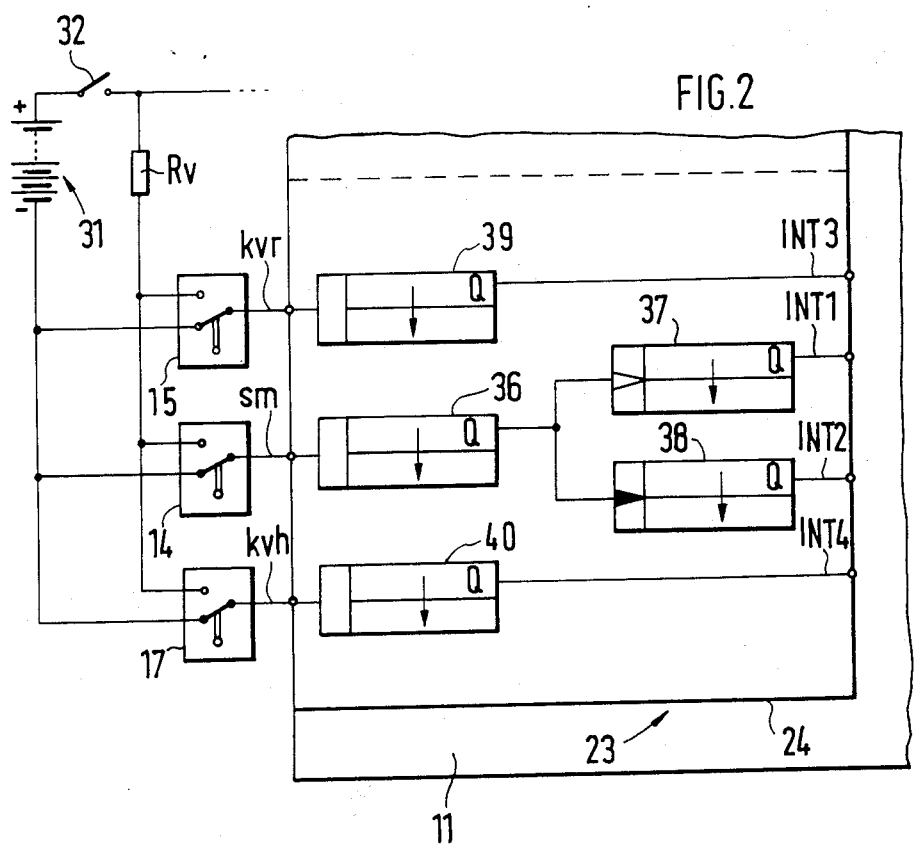

SHIFTING ARRANGEMENT FOR AN AUTOMATIC TRANSMISSION OF A MOTOR VEHICLE

BACKGROUND AND SUMMARY OF THE INVENTION

The present invention relates to a shifting arrangement for an automatic transmission of a motor vehicle of the type disclosed in the DE No. 38 07 881.

A shifting arrangement for an automatic transmission of a motor vehicle is provided according to the DE No. 38 07 881 which renders realizable by means of the selector lever a program "Manual Speed Preselection" of an automatic transmission controlled by way of an electronic control apparatus according to Bosch, Technische Berichte [Technical Reports] 7 (1983) 4, Pages 160-166. A program switch which enables to the driver a selection between an economy program, a power program and a program for the manual selection of the transmission speeds by way of the selector lever can be dispensed with in that case. The transmission can be constructed more friendly as regards operation and can be manufactured in a more cost-favorable manner.

This is achieved in the first instance in that the selector lever is shiftable by way of a transverse lane into a second shifting lane parallel to the first shifting lane and in that with the displacement of the shifting lever in the second shifting lane the forward speeds (1, 2, 3, 4) of the transmission are manually engageable. In a particularly advantageous construction, the shifting lever is thereby constructed in the second shifting lane as rocker lever which during pivoting out of a stable center position (normal rest position) into the one direction initiates a shifting-down and in the other direction a shifting up of the automatic transmission.

It is the object of the present invention to further increase the operating safety of such an automatic transmission.

The underlying problems are solved according to the present invention in that the control apparatus includes a shifting unit influenced by a sensor detecting the shifting from the first shifting lane to the second shifting lane, which during an introduction of the shifting lever from the first shifting lane into the second shifting lane effects a maintenance of the actually engaged transmission speed at least for such length of time as a rotational speed of a driving internal combustion engine has not yet exceeded an upper rotational speed limit or has not yet dropped below a lower rotational speed limit, or the shifting lever has not yet been displaced in the second shifting lane.

The advantages of the present invention reside primarily in that the operating reliability and operational safety of the automatic transmission is further increased. In particular, undesired shifting operations (which come as a surprise to the driver) are thereby avoided when shifting the shifting lever from one lane into the other.

This is achieved in that a control apparatus for the control of the transmission includes a shifting unit which during the introduction of the shifting lever out of the first shifting lane into the second shifting lane effects a maintenance of the actual transmission speed at least as long as a rotational speed of a driving internal combustion engine has not yet exceeded an upper rotational speed limit or has not yet dropped below a lower rotational speed limit, or the shifting lever has not yet been displaced in the second shifting lane for the initiation of a shifting-up/shifting-down operation.

Similarly during the introduction of the shifting lever from the second shifting lane into the first shifting lane, the actually engaged transmission speed is maintained at least so long until the control apparatus has undertaken anew an automatic transmission speed adaptation or until the internal combustion engine has reached its rotational speed limits.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is a schematic diagram of a shifting unit in accordance with the present invention according to FIG. 1;

DETAILED DESCRIPTION OF THE DRAWINGS

Figure 1:
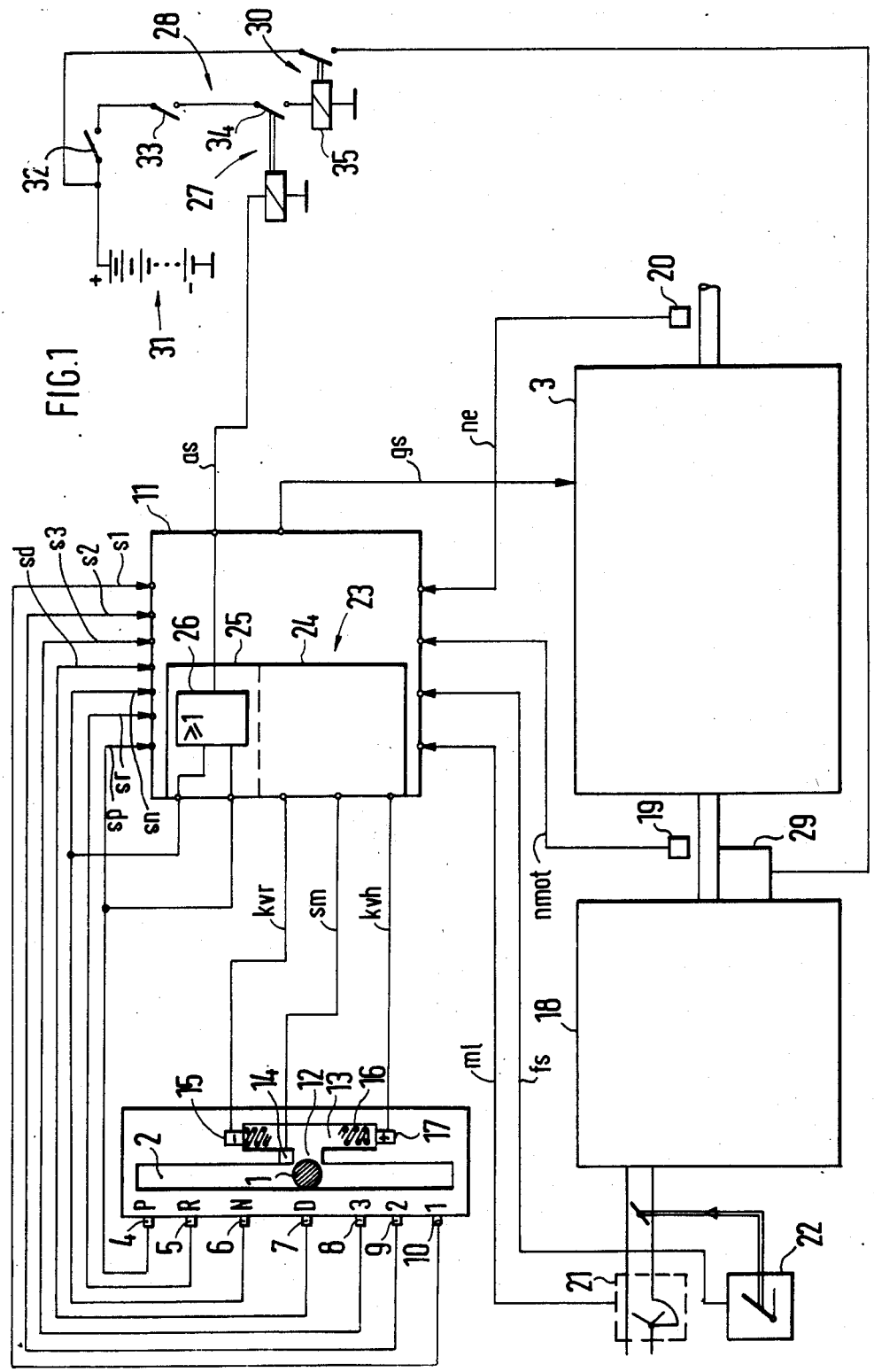
FIG. 1 is a schematic block diagram of a transmission control system with a shifting arrangement and with a shifting unit according to the present invention.

Referring now to the drawing and more particularly to FIG. 1, the different positions P=parking, R=reverse speed, N=neutral-zero, D=drive with the speeds 1 to 4, 3 (limitation to the lowermost three speeds), 2 (limitation to the lowermost two speeds), 1 (first speed) of an automatic transmission are freely selectable by means of a shifting lever 1 which can be displaced in a first shift lane 2 in the longitudinal direction of the motor vehicle. The selected positions are detected by sensors 4 to 10 which apply electrical signals sp, sr, sn, sd, s3, s2 and s1 to a control apparatus 11 of the transmission 3. Out of the selected position D, the shifting lever can be shifted by way of a transverse lane 12 into a shifting lane 13 parallel to the first shifting lane 2. The shifting operation is detected by a sensor 14 which thereby supplies a signal sn to the control apparatus 11.

During the displacement or pivoting of the shifting layer 1 in the second shifting lane 13 in the driving direction of the motor vehicle, a minus-sensor 15 responds whose signal kvr causes the control apparatus 11 to undertake a shifting-down by one speed by way of the transmission control signals gs at the transmission 3. Thereafter, the shifting lever 1 is pressed back into the neutral position of the shifting lane 13 by a spring 16. When contacting once ore the sensor 15 by displacement of the shifting lever 1, a further shifting-back by one speed takes place insofar as the highest transmission ratio (lowest speed) has not already been engaged. When displacing the shifting lever 1 opposite the driving direction, a plus-sensor 17 applies a signal kvh to the control apparatus 11 and initiates in the transmission 3 a shifting-up by one speed.

However, a manually requested shifting-up will be carried out in that case only insofar as an engine rotational speed nmot of an internal combustion engine 18 driving the transmission 3 does not drop below a minimum rotational speed nmin in the next higher speed; a shifting-down initiated at the shifting lever 1 is correspondingly suppressed insofar as the engine rotational speed nmot in the next lower speed would exceed the maximum rotational speed nmax of the internal combustion engine.

The engine rotational speed nmot is thereby determined by way of an engine rotational speed sensor 19 and as also a transmission output rotational speed ne (driving velocity pick-up 20), an engine load signal nm (air quantity-, air mass- or throttle valve position pick-up 21) and a drive pedal position signal fs of a drive pedal position pick-up 22 is made available to the control apparatus 11 which determines from the given input signal combination and the actually engaged transmission ratio k the transmission control signals gs corresponding to the manual speed preselection or to a customary automatic program.

The control apparatus 11 which may be realized, for example, corresponding to Bosch Technische Berichte 7 (1983) 4, Pages 160-166, is now expanded according to the present invention as follows:

A shifting unit generally designated by reference numeral 23 is integrated into the control apparatus 11, whose partial unit 24 influences especially on the basis of the signal sm from the sensor 14 of the control apparatus 11 to the extent that during an introduction of the shifting lever 1 out of the first shifting lane 2 into the second shifting lane 13 a maintenance of the actually engaged transmission speed k is effected at least for such length of time as a rotational speed nmot of a driving internal combustion engine 18 has not yet exceeded the upper rotational speed limit nmax or has not yet dropped below the lower rotational speed limit nmin or the shifting lever 1 has not yet been displaced in the second shifting lane 13 for the initiation of a shifting-up or shifting-down operation.

The partial unit 24 of the shifting unit 23 also influences the control apparatus 11 in such a manner that with an introduction of the shifting lever 1 out of the second shifting lane 13 into the first shifting lane 2 a maintenance of the actually engaged transmission ratio k is effected at least for such length of time until the control apparatus 11 has undertaken anew an automatic transmission speed adaptation or as long as a rotational speed nmot of a driving internal combustion engine 18 has not yet exceeded the first upper rotational speed limit or has not yet dropped below the second lower rotational speed limit.

The shifting unit 23 further includes a second partial unit 25 which prevents a starting of the internal combustion engine when the shifting lever is located in the second shifting lane 13; especially the starting of the internal combustion engine is permitted only in a park position P and in a neutral position N of the shifting lever 1 in the first shifting lane 2: for that purpose, the second partial unit 25 of the shifting unit 23 detects the signals sp and sn of the sensors 4 and 6 detecting the shifting lever positions P and N of the shifting lever 1 in the first shifting lane 2.

The signals sp and sn are linked by means of an OR element 26; the OR element 26 activates by way of a starter release signal as a relay 27. The relay 27 interrupts in a non-energized condition a control current circuit 28 of a starter relay 30 initiating the starting of the internal combustion engine 18 by means of the starter 29. The control current circuit 28 is thereby formed by a series circuit of an ignition switch 32 connected to a battery 31, of a starter switch 33 of the normally open contact 34 of the relay 27 and of a coil 35 of the starter relay 30.

Reference will now be made to FIG. 2 for the (internal and external) wiring arrangement of the first partial unit 24 of the shifting unit 23. It is thereby assumed that the sensors 14 and 15, respectively, 17 are constructed as limit switches (limit sensors) which in the non-actuated condition are connected to ground (minus terminal of the battery 31) and in the actuated condition (shifting lever in the second shifting lane 13, respectively, in one of the two end positions) are connected to the positive terminal of the battery 31 by way of a series-resistance Rv and the ignition switch 32.

The thus-produced signal sm is connected for the purpose of contact anti-chatter to a first static retriggerable monoflop 36 (monostable multivibrator) whereby a second pulse-flankcontrolled non-retriggerable monoflop 37 is controlled by the output of the first monoflop 36; the second monoflop 37 produces with a positive pulse flank a first interrupt signal INT1. The output of the first monoflop 36 also controls a third pulse-flank-controlled non-retriggerable monoflop 38 which, with a negative pulse flank at the output Q of the first monoflop 36, produces a second interrupt signal INT2.

The signals kvr and kvh are also subjected to anti-chatter action by means of a fourth and fifth retriggerable statically controlled monoflop 39 and 40 producing a third and fourth interrupt signal INT3 and INT4, which can be integrated in the shifting unit 23 (however do not necessarily need to be so integrated).

By way of the first interrupt signal INT1 a shifting takes place in the control apparatus 11 from automatic speed selection to a manual speed selection, for example, in that a flag is set; the shifting in the reverse direction is effected by the second interrupt signal INT2 which resets the flag.

The program for producing the transmission control signals gs which is executed in the control apparatus 11, as a rule provides a continuously traversed or passed-through program loop in the course of which all input signals of the control apparatus 11 are determined, the limit rotational speeds of the internal combustion engine 18 (nmax, nmin) are monitored and possibly a shifting-up, respectively, shifting-down takes place, the flag is queried and depending on the condition of the flag a manual or automatic speed adaptation is passed through and again possibly a shifting-up or shifting-down takes place.

The automatic speed adaptation can thereby be left at any time by the interrupt signal INT1 and the program sequence can be started anew; in this manner, an actually engaged transmission speed is maintained. Similarly, the manual speed adaptation is left by the interrupt signal INT2 and the program sequence can be started anew.

The interrupt signals INT3 and INT4 decrease, respectively, increase each one transmission ratio preselector counter; in the manual speed adaptation a transmission ratio is then matched or adapted to the state of the transmission ratio preselector counter.

Figure 3:
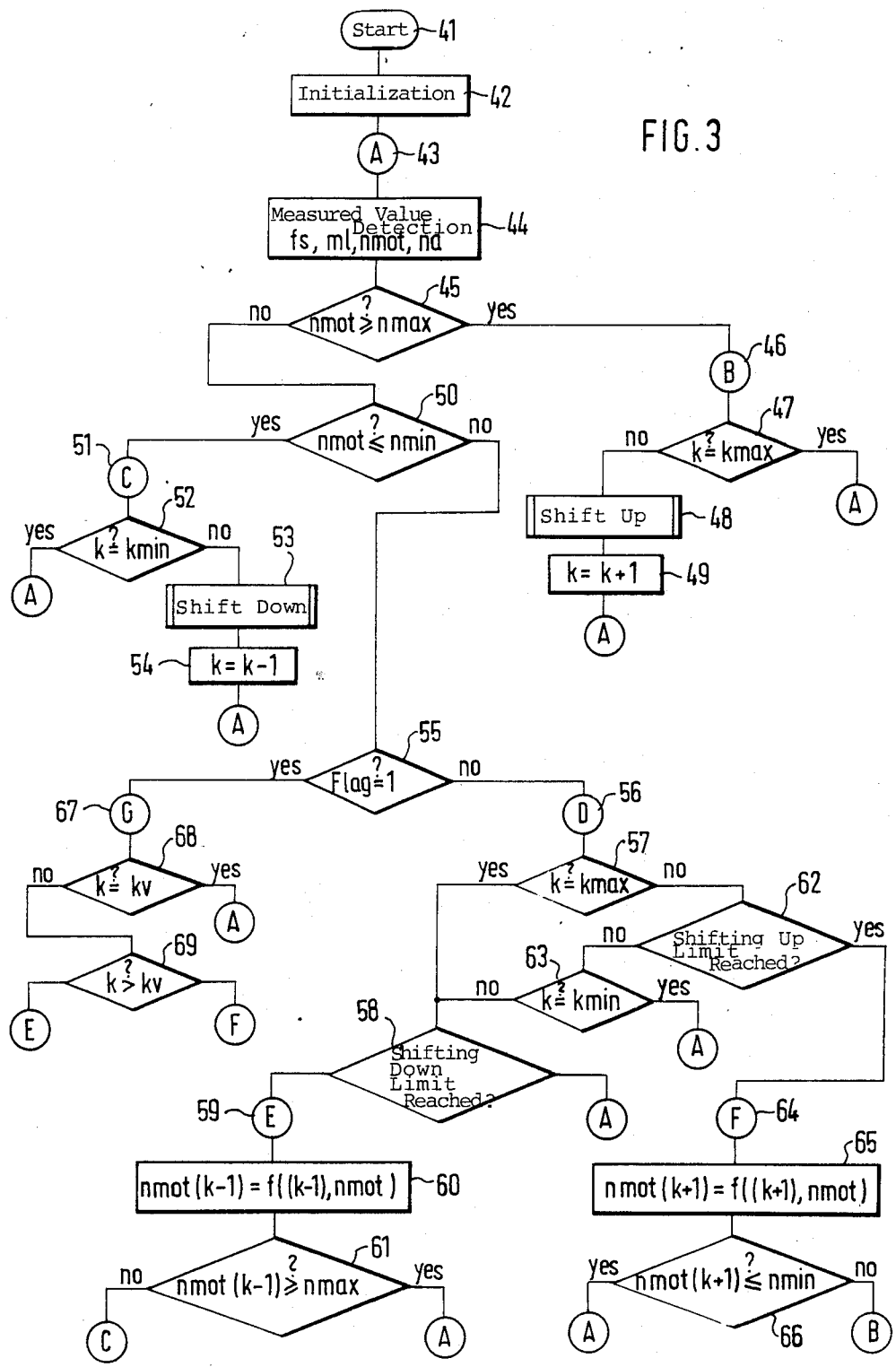
FIG. 3 is a flow diagram of a control sequence for the transmission controls.

A flow diagram of such a program is shown in FIG. 3. After the program start 41 and the computer initialization 42, a label A, 43 is passed and the measured values of drive pedal position fs, load signal ml, engine rotational speed nmot and transmission output rotational speed na (driving velocity) are detected and edited, 44.

Subsequently, the limit rotational speeds nmax, nmin of the internal combustion engine are monitored and possibly a shifting up or shifting down takes place:

In the program step 45, query is made whether the engine rotational speed nmot is greater than or equal to nmax, if yes, after passing a label B, 46, query is made in the next program step 47 whether already the highest transmission speed kmax is engaged. If yes, the program returns to the label A, if no, a subprogram "shifting up" 48 is called up which activates the shifting-up operation at the transmission. Thereafter, a transmission ratio counter k is increased by one, 49, and the program jumps back to the label A. If the query 45 is negative, then a further query 50, takes place whether the engine rotational speed is smaller than or equal to nmin. If yes, after passing a label C, 51, the program queries whether the lowest transmission speed kmin is already engaged, 52; if yes, the program branches back to label A, if no, a subprogram "shifting down", 53 is called up. Thereafter, the transmission ratio counter k is reduced by one, 54 and the program branches back to the label A.

If the query 50 is negative, then the limit rotational speed monitoring is terminated and the program examines whether the flag has been set, 55. If this is not the case, then after passing a label D, 56, the automatic transmission speed adaptation is passed through. If the highest transmission speed is reached, query 57, then the program examines whether a shifting-down limit is reached, 58; if no, the program branches to the label A, if yes, after passing a label E, 59, the engine rotational speed nmot (k−1) in the next lower speed is determined from transmission speed and engine rotational speed, 60, and the program examines whether the same is larger than or equal to the maximum rotational nmax. If yes, the program branches to the label A, if no, to the label C. If the query 57 is negative, then the program examines whether the shifting-up limit is reached, 62; if no, the program examines, 63, whether the lowest speed kmin is engaged, if yes, the program branches to the label A. If no, the program continues with the program step 58.

If the query 62 is positive, then after passing a label F, 64, the engine rotational speed nmot (k+1) in the next higher transmission speed is calculated, 65, and query is made, 66, whether the same is smaller than or equal to the minimum rotational speed nmin; if yes, the program returns to the label A. If no, the program proceeds to the label B. The automatic speed adaptation is thus terminated with the queries 61, respectively, 66.

If the flag has been set (query 55), then after passing a label G, 67, the program examines whether the transmission ratio counter k corresponds to a status of a transmission ratio preselector counter kv, 68; if yes, the program branches back to the label A, if no, the program examines whether the engaged transmission speed is higher than the preselected one, 69. If yes, the program jumps to the label E, if no, the program jumps to the label F.

Figure 4:
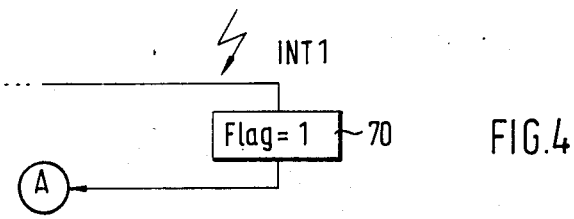
FIGS. 4-7 are a first, second, third and fourth interrupt program for the control sequence according to FIG. 3.
Figure 5:
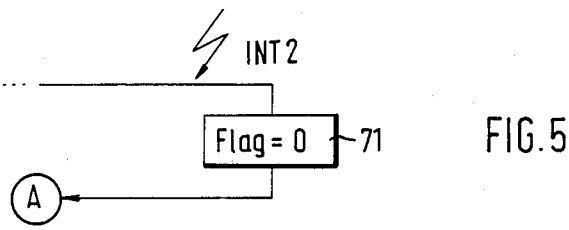
Figure 6:
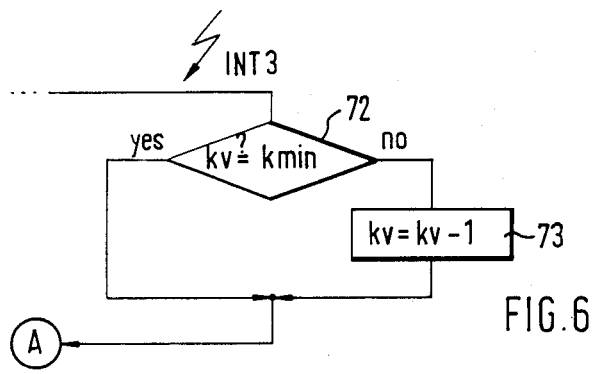
Figure 7:
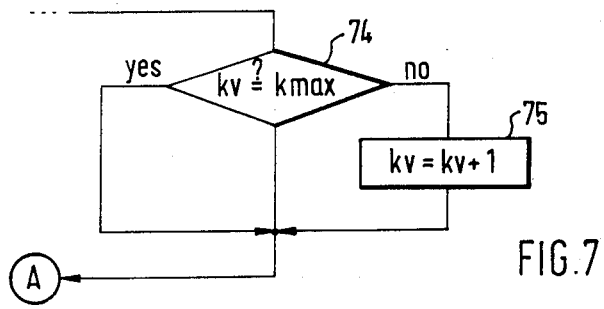

In FIGS. 4 and 5, a first and a second interrupt program is shown which is initiated by the interrupts signals INT1 and INT2, and in the former case effects a setting of the flag 70 and in the second case a resetting of the flag 71; thereafter the program returns in each case to the label A of the main program.

A third interrupt program is started by means of the interrupt signal INT3 which examines whether the transmission ratio preselector counter kv corresponds already to the lowest speed kmin, 72; if no, the transmission ratio preselector counter kv is reduced by one, 73 and the program jumps back to the label A in the main program, if yes, the program branches directly to the label A.

Correspondingly, a fourth interrupt program is started by means of the interrupt signal INT4 which examines, 74, whether the transmission ratio preselector counter kv has already reached the highest transmission speed kmax. If no, the transmission ratio preselector counter kv is increased by one, 75 and the program jumps back to the label A in the main program, if yes, it branches directly to the label A.

The subprograms "shifting down" 53 and "shifting up" 48 for producing the transmission control signals gs will not be described in detail herein because the same, though specific to particular transmissions, are known as such. The same is true for the determination of the shifting up and shifting down limits which generally depend on the signals engine load ml, engine rotational speed nmot and driving velocity na and frequently are stored in performance graphs.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A shifting arrangement for an automatic transmission of a motor vehicle controlled by an electronic control means, comprising shifting lever means operable by displacement thereof in a first shifting lane to preselect the different transmission speeds to be automatically engaged, the shifting lever means being operable to be shifted from the first shifting lane by way of a transverse lane into a second shifting lane substantially parallel to the first shifting lane, the forward speeds of the transmission being manually engageable by actuation of the shifting lever means in the second shifting lane, the control means including a shifting unit means influenced by a sensor means detecting the shifting from the first shifting lane to the second shifting lane, the shifting unit means being operable during the introduction of the shifting lever means from the first shifting lane into the second shifting lane to maintain the actually engaged transmission speed at least for such length of time as a rotational speed of a driving internal combustion engine has not yet exceeded an upper rotational speed limit or has not yet dropped below a lower rotational speed limit, or the shifting lever means has not yet been displaced in the second shifting lane.

2. A shifting arrangement according to claim 1, wherein by a one-time displacement of the shifting lever means out of a neutral center position and by contact with a plus sensor means in one direction a shifting-up by one speed is operable to be effected and by a one-time displacement of the shifting lever means in the opposite direction and by contact with a minor sensor means, a shifting down by one speed is operable to be manually effected, and further comprising means for returning the shifting lever means automatically to the neutral center position subsequent to a contact with the plus or minus sensor means.

3. A shifting arrangement according to claim 1, wherein the shifting unit means during an introduction of the shifting lever means out of the second shifting lane into the first shifting lane is operable to maintain the actually engaged transmission speed at least for such length of time until the control means has undertaken anew an automatic transmission speed adaptation or as long as the rotational speed of the driving internal combustion engine has not yet exceeded the upper rotational speed limit or has not yet dropped below the lower rotational speed limit.

4. A shifting arrangement according to claim 3, wherein the shifting unit means is operable to preclude a starting of the internal combustion engine with the shifting lever means in the second shifting lane.

5. A shifting arrangement according to claim 4, wherein the shifting means is operable to permit a starting of the internal combustion engine only in a park position and in a neutral position of the shifting lever means in the first shifting lane.

6. A shifting arrangement according to claim 2, wherein the shifting unit means during an introduction of the shifting lever means out of the second shifting lane into the first shifting lane is operable to maintain the actually engaged transmission speed at least for such length of time until the control means has undertaken anew an automatic transmission speed adaptation or as long as the rotational speed of the driving internal combustion engine has not yet exceeded the upper rotational speed limit or has not yet dropped below the lower rotational speed limit.

7. A shifting arrangement according to claim 6, wherein the shifting unit means is operable to preclude a starting of the internal combustion engine with the shifting lever means in the second shifting lane.

8. A shifting arrangement according to claim 7, wherein the shifting means is operable to permit a starting of the internal combustion engine only in a park position and in a neutral position of the shifting lever means in the first shifting lane.

9. A shifting arrangement for an automatic transmission of a motor vehicle controlled by an electronic control means, comprising a manually actuatable shifting lever operable to select by displacement thereof in a first shifting lane the different transmission speeds to be automatically engaged, the shifting lever being operable after displacement thereof by way of a transverse lane into a second shifting lane to manually engage the desired forward speed, and means including sensor means for detecting the displacement of the shifting lever means through the transverse lane, and a shifting unit means influenced by the output of said sensor means operable to maintain an actually engaged transmission speed in case of a change of the shifting lanes.

10. A shifting arrangement according to claim 1, wherein the shifting means is operable to permit a starting of the internal combustion engine only in a park position and in a neutral position of the shifting lever means in the first shifting lane.

* * * * *